United States Patent [19]

Heimerl et al.

[11] Patent Number: 4,690,781
[45] Date of Patent: Sep. 1, 1987

[54] METHOD OF FILLING A METAL VESSEL WITH A GLASS MELT CONTAINING HIGHLY RADIOACTIVE FISSION PRODUCTS

[75] Inventors: Wilfried Heimerl, Mol; Eckhart Ewest, Balen, both of Belgium

[73] Assignee: Deutsche Gesellschaft für Wideraufarbeitung von Kernbrennstoffen mbH, Hanover, Fed. Rep. of Germany

[21] Appl. No.: 881,008

[22] Filed: Jul. 1, 1986

Related U.S. Application Data

[62] Division of Ser. No. 627,473, Jul. 3, 1984.

[30] Foreign Application Priority Data

Jul. 8, 1983 [DE] Fed. Rep. of Germany ....... 3324696

[51] Int. Cl.⁴ .......................... G21F 9/16; G21F 9/34; C03B 7/18
[52] U.S. Cl. ..................... 252/633; 53/268; 53/468; 65/124; 65/213; 141/113; 141/374; 250/506.1; 252/628; 252/629; 376/272
[58] Field of Search ............... 376/261, 272; 252/629, 252/626, 628, 633; 250/506.1, 507.1; 65/213, 73, 17, 75, 33, 34, 36, 56, 59.1, 130, 122, 165, 124, 133, 213, 137, 329; 141/113, 369, 374; 53/268, 467–468, 477; 215/32, 33

[56] References Cited

U.S. PATENT DOCUMENTS

| | | | |
|---|---|---|---|
| H152 | 11/1986 | Lampe | 252/633 |
| 4,115,311 | 9/1978 | Sump | 252/629 |
| 4,234,449 | 11/1982 | Wolsow et al. | 252/629 |
| 4,281,691 | 8/1981 | Goutard et al. | 252/633 |
| 4,326,918 | 4/1982 | Lapides | 252/629 |
| 4,341,547 | 7/1982 | Heimerl | 65/124 |
| 4,341,915 | 7/1982 | Adachi et al. | 252/632 |
| 4,404,129 | 9/1983 | Penberty et al. | 252/633 |
| 4,462,200 | 7/1984 | Stritzke | 65/124 |
| 4,582,674 | 4/1986 | Stritzke | 252/628 |

FOREIGN PATENT DOCUMENTS

0207360 2/1968 U.S.S.R. .................... 65/124

Primary Examiner—Stephen J. Lechert, Jr.
Assistant Examiner—Howard J. Locker
Attorney, Agent, or Firm—Walter Ottesen

[57] ABSTRACT

The invention is directed to a method of filling an evacuated metal vessel with a radioactive glass melt from a glass melting furnace. The metal vessel is equipped with a suction tube mounted at the bottom of the vessel. The steps of filling and sealing the metal vessel are carried out faster and with the furnace atmosphere properly sealed off. For this purpose the vessel is placed in a holding device which is positioned over a closable suction port of the glass melting furnace. The suction port is hermetically sealed off from the atmosphere of the cell and is then opened. The vessel is lowered vertically until the suction tube dips into the glass melt. After the vessel has been filled, the glass in the suction tube is frozen thereby forming a plug. The vessel is moved upwardly in the vertical direction until the suction tube is drawn out of the furnace. The suction port is closed and a sealing cover for the vessel is put into position over the port. The vessel is then again lowered in the holding device thereby causing the suction tube to be pushed inside the vessel. The vessel is lowered to the extent that finally the edge of the metal vessel passes over the sealing cover. An apparatus for carrying out the method is also disclosed.

3 Claims, 19 Drawing Figures

METHOD OF FILLING A METAL VESSEL WITH A GLASS MELT CONTAINING HIGHLY RADIOACTIVE FISSION PRODUCTS

This is a division of application Ser. No. 627,473, filed July 3, 1984.

FIELD OF THE INVENTION

The invention relates to a method of filling a metal vessel with a radioactive glass melt from a glass melting furnace by utilizing suction. The metal vessel is provided with a suction tube mounted to the lower end thereof.

BACKGROUND OF THE INVENTION

When irradiated nuclear reactor fuel elements are reprocessed, highly active waste is obtained in the form of highly active liquid concentrates of fission products. These liquid concentrates are solidified by appropriate vitrification processes. Glass-forming materials are added and the radioactive materials are melted to glass. The radioactive glass melt is placed in metal vessels made of special steel, so-called molds. After cooling, solidification and possibly quite long surface storage, it is intended that the glass-filled steel molds be taken to the ultimate storage location.

The melting of the glass-forming materials with the radioactive substances is usually carried out in a ceramic melting furnace directly heated by electricity. In the furnace the calcined fission product is continuously fused into the bath of glass melt. Metal vessels are then filled at intervals with the glass containing the radioactive substances.

Essentially three methods are known for filling the metal vessels from the glass melting furnace, namely: the bottom discharge system; the overflow system; and, the suction method.

The bottom discharge system basically includes an opening in the bottom of the furnace in which the glass can either be frozen up by cooling or melted by heating. If the glass in the bottom opening is melted, the glass melt running out fills a metal vessel standing under the furnace.

With the overflow system the melt is preferably discharged via a second chamber of the melting furnace having a port in the side wall. The second chamber communicates with the main chamber at the bottom of the furnace. When a given degree of fullness is exceeded, the glass runs out of the port in the side wall and through a horizontal overflow pipe into the metal vessel.

In the suction method, a partial vacuum is established in the metal vessel and the vessel is sealed in a vacuum-tight manner. After a sealed suction tube mounted on the metal vessel dips into the glass melt from above and after the seal in the suction tube melts open, the partial vacuum in the metal vessel causes the glass melt to be drawn by suction into the closed metal vessel.

The suction method has important advantages. The quantity of glass melt drawn in is determined by the partial vacuum in the vessel. It is no longer possible to overfill the vessel. Furthermore, sediments located in the furnace can be drawn up with the glass melt by utilizing suction.

A process of this type, where the glass is removed from a ceramic melting furnace by the suction method, is known from published German patent application DE-OS No. 29 27 795. In this process, the suction tube projects through a suction port into the glass melt in the furnace and is joined to the metal vessel in a vacuum-tight manner until the filling process is completed. Thereafter, the suction tube is separated from the vessel and broken up. The fragments of the suction tube are placed in a further empty vessel.

Published German patent application DE-OS No. 29 27 795 discloses that the suction port of the glass melting furnace should be equipped with a yielding closure. The closure should preferably be in the form of an annular lamellar diaphragm biased in the closing direction. The flexible closure of the suction port of the furnace has been found to have a short life because of the heavy load.

A further method of removing glass from a ceramic melting furnace with suction is known from German Pat. No. 30 22 387. In this method, the suction tube, joined to the bottom of a metal vessel to be filled, is sealed when the vessel has been filled, and is pushed axially inside the vessel through an opening in the bottom thereof. The opening is subsequently closed by inserting a vessel sealing cover therein. The cover is inserted in a separate method step. The metal vessel is transported away from the glass melt furnace to a guide device and is placed in the guide device which prevents any canting of the vessel with the suction tube projecting from the bottom thereof. The sealing cover is pre-positioned beneath the metal vessel with the inner surface thereof facing upwardly. The vessel is lowered by gravity. The mouth of the suction tube touches down on the cover. The weight of the glass-filled metal vessel causes the suction tube to be severed at predetermined breaking locations provided in the bottom of the vessel and to be pushed inside the vessel. The vessel is lowered over the sealing cover. The opening in the bottom of the vessel through which the tube is pushed into the vessel interior is closed by this sealing cover. The sealing cover is placed on the vessel by means of a shrink fit.

SUMMARY OF THE INVENTION

It is an object of the invention to provide a method for filling a metal vessel with radioactive glass melt in such a way that the steps of filling and sealing the metal vessel can be carried out faster and while the atmosphere of the furnace is well sealed off with respect to the atmosphere of the cell.

The method of the invention is for filling a metal vessel with a radioactive glass melt from a glass-melt furnace disposed in a cell of a nuclear facility. The furnace has a closable suction port that communicates with a chamber of the furnace containing the radioactive glass melt and the vessel is provided with a suction tube mounted on the base wall thereof so as to communicate with the interior of the vessel. The suction tube is sealed with a solid fused mass and the metal vessel is evacuated so that a partial vacuum is present therein.

The method of the invention includes the steps of: placing the metal vessel with the sealed suction tube extending therefrom into a holding device surrounding the vessel; positioning the holding device over the closable suction port of the glass-melt furnace so as to align the suction tube with respect thereto and so as to cause the holding device to hermetically seal off the suction port with respect to the atmosphere in the cell; opening the suction port thereby causing the chamber to communicate with the interior of the holding device; lowering the metal vessel until the suction tube dips into the glass melt in the chamber thereby causing the solid fused mass to melt whereby the glass melt flows upwardly into the metal vessel; freezing the glass melt in the suction tube thereby again sealing the same with a solid fused mass; moving the metal vessel upwardly until the suction tube is withdrawn from the furnace; closing the suction port and positioning a sealing cover for the metal vessel directly beneath the latter so that the inner surface of the cover faces upwardly; and, again lowering the metal vessel to cause the suction tube to come into contact engagement with the inner surface of the cover thereby pushing the suction tube into the metal vessel as the same is lowered further and finally seating the cover in the metal vessel.

The method of the invention enables the interior of the glass melting furnace to be hermetically separated from the atmosphere of the cell during the filling operation. Contamination of the atmosphere of the cell in which the furnace is located is reduced. Capping of the metal vessel filled with glass melt is simpler and faster with the method of the invention because capping is carried out in the same position of the holding device as the filling operation.

According to another feature of the method of the invention, the level to which the metal vessel has been filled during filling can be determined by measuring the net weight of the glass melt flowing into the vessel.

Measuring the degree to which the metal vessel has been filled is possible because the holding device or part of the holding device is suspended and is moved with the metal vessel vertically on a crane or similar load hoisting gear.

After the metal vessel has been filled with the radioactive glass melt, the method can include the further step of lifting the metal vessel somewhat so that the end of the suction tube still remains immersed in the glass melt in the chamber; and, thereafter spraying a refrigerant on the suction tube at the upper portion thereof to thereby again seal the same with a solid fused mass.

As a result of the application of a refrigerant, a glass plug is formed in the suction tube so that no liquid glass can flow out of the vessel.

It is also an object of the invention to provide an apparatus for carrying out the method of the invention.

With the apparatus of the invention, the evacuated metal vessel described above is filled with the radioactive glass melt from the furnace disposed in a cell of a nuclear facility. The apparatus includes: holding means for accommodating the evacuated metal vessel therein for movement in the vertical direction with respect to the furnace between a first position whereat the suction tube is above the suction port and a second position whereat the suction tube is in the suction port and dipped into the glass melt thereby melting the solid fused mass and causing the metal vessel to be filled with glass melt; retractable closure means for opening the suction port to permit movement of the suction tube into the suction port and the glass melt and for closing the suction port after the suction tube has been withdrawn from the glass melt and the suction port; the closure means including carrying means for accommodating a cover for the metal vessel and for positioning the cover beneath the metal vessel when the suction port is closed; and, sealing means for hermetically sealing off the suction opening with respect to the atmosphere of the cell when the holding means is positioned above the suction port.

According to another feature of the invention, the sealing means is conjointly defined by the holding means and the closure means.

The suction port is hermetically sealed from the atmosphere of the cell conjointly by the closure means and the holding means when the holding means is placed in position on the closure means. The closure means carries and supports the vessel sealing cover which is pushed into position over the suction port when the latter is closed off after the metal vessel has been filled with the radioactive glass melt.

According to another feature of the invention, the closure means can include a box-like housing mounted on the furnace and having upper and lower walls defining respective openings coaxial with the suction port; and, an elongated slider having a closure mounted on one end thereof. The slider is movably mounted in the housing between a withdrawn position whereat the suction port is open and an extended position whereat the closure closes off the suction port. The carrying means can be a receiving mount for accommodating the cover of the metal vessel. The receiving mount defines a center axis and is mounted at the one end of the slider for movement therewith. The center axis is vertical and perpendicular to the direction of the movement of the slider.

In this way, the vessel sealing cover will be accommodated in the enclosed space bounded by the furnace, the closure means and the holding means. This enclosed space need not be opened to the atmosphere of the cell in order to place the cover on the metal vessel.

With the configuration defined above, the sealing cover is centered relative to the metal vessel preparatory to the capping of the metal vessel which follows the filling process.

In an advantageous embodiment of the invention, the holding means for accommodating the metal vessel is formed by two telescoping sleeves. The holding means is provided to transport the metal vessel and to protect the suction tube during transport and positioning on the closing means. A further function of the holding means is to hermetically seal the suction port and thus the atmosphere of the furnace from the atmosphere of the cell, and to provide guidance during vertical movements of the metal vessel in the filling process.

According to another feature of the invention, the glass-melt furnace can have a stepped portion defining a horizontal plane at an elevation lower than the level of the top of the furnace and the vertical wall of the step defines an arcuate recess formed therein concentric to the suction port of the furnace. The box-like housing of the closure means can be elongated and have a rounded end portion adapted to fit into the arcuate recess.

With this arrangement, the suction port may be arranged closer to the vertical furnace wall bounding the step of the furnace. This enables the adjacent chamber of the furnace to be made smaller.

The invention makes it possible to fill a metal vessel with radioactive glass melt by the suction method and this can be done with added safety and greater simplicity. The invention prevents the atmosphere of the furnace from communicating with that of the cell during the filling process. In addition, the method and apparatus according to the invention give the installation a considerably longer working life. The vertical downward movement of the metal vessel, which is necessary to cap the filled metal vessel, is also utilized by the invention to carry out the filling process.

Because of the invention, metal vessels can be filled with glass melt by the suction method under hermetically sealed conditions. Remote operation of the filling and sealing process is facilitated or made possible.

BRIEF DESCRIPTION OF THE DRAWING

The invention will now be described with reference to the drawing wherein.

DESCRIPTION OF THE PREFERRED EMBODIMENTS OF THE INVENTION

Figure 1:
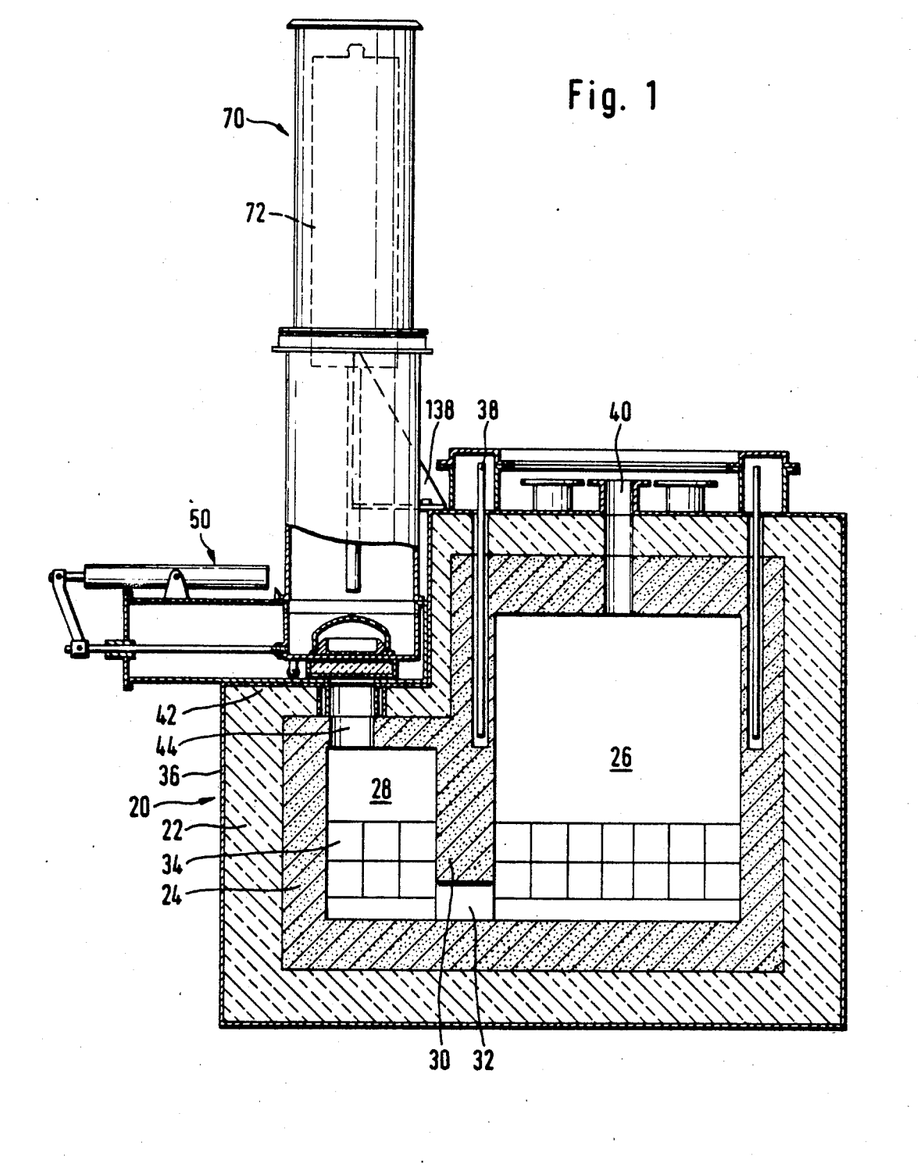
FIG. 1 is a side elevation view, partially in section, of a ceramic melting furnace and an embodiment of an apparatus according to the invention for filling a metal container with a glass melt containing highly radioactive fission products.

The ceramic melting furnace shown in FIG. 1 is configured to have two zones. The outer zone 22 is provided for thermal insulation. The inner zone 24 includes a refractory ceramic melting tank. The ceramic wall 24 encloses a melting chamber 26 containing glass melt. In addition to the melting chamber 26, a separate adjacent chamber 28 is provided which communicates with the main melting chamber 26 at the bottom of the furnace by passage 32 formed in a partition wall 30 made of ceramic material. Electrodes 34 are fitted in the side walls of both chambers to provide for direct electric heating of the molten bath. A steel housing 36 encloses the insulation of the furnace 20. In the main chamber 26, heating rods 38 are arranged in the upper ceramic walls to heat the upper part of the furnace 20. The fission products and glass frit are fed to the furnace 20 through a feed conduit 40.

Figure 2:
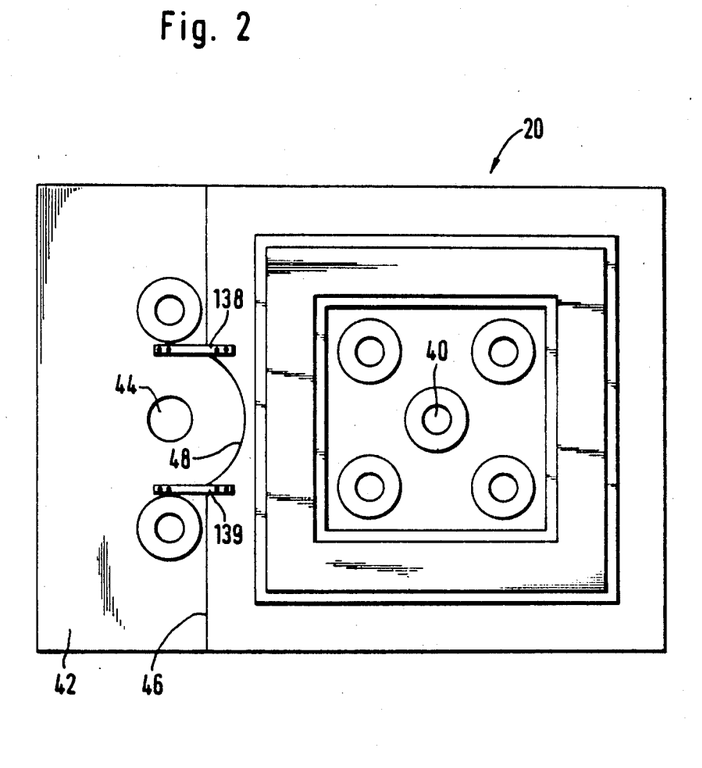
FIG. 2 is a plan view of the melting furnace of FIG. 1 with the closure assembly, holding device, and steel mold omitted.

The adjacent chamber 28 has a height less than the main chamber 26. Therefore, the cover of the adjacent chamber 28 is a shorter distance away from the surface of the molten bath and the outer configuration of the furnace 20 defines a step 42 in the region of the chamber 28. A suction port 44 communicating with the adjacent chamber 28 is provided in the step 42. Concentrically with the suction port 44, the vertical boundary surface 46 of the step 42 contains an arcuate recess 48 (FIG. 2).

Figure 3:
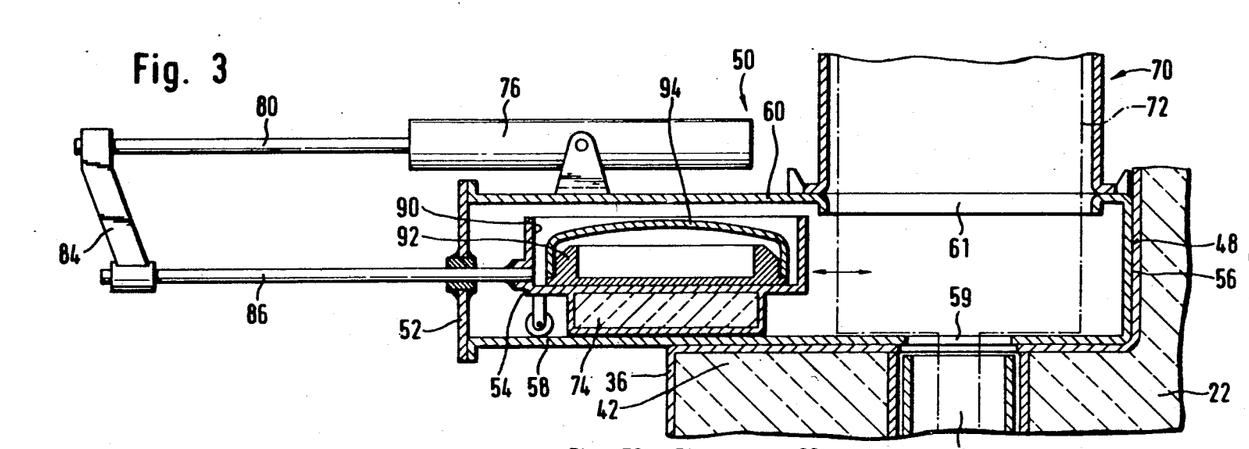
FIG. 3 is a side elevation view, partially in section, of the closure assembly with the suction port opened and the holding device in position.
Figure 4:
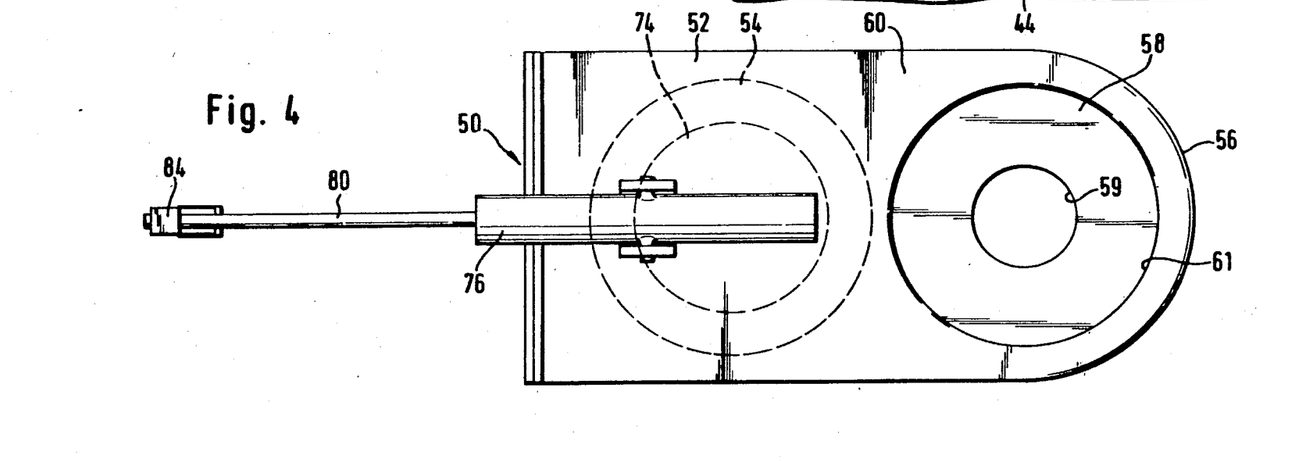
FIG. 4 is a plan view of the closure assembly of FIG. 3.

A closure device 50 for closing the suction port 44 is mounted on step 42 of the furnace as shown in FIGS. 3 and 4. The closure device essentially includes a slide housing 52 and a slide assembly 54 displaceably mounted therein. The slide housing 52 has a semicircularly rounded end portion 56 disposed in the arcuate recess 48 of the furnace. The slide housing 52 has respective openings 59 and 61 in its base wall 58 and upper boundary wall 60. The openings 59 and 61 are concentric with suction port 44.

Part of a holding device 70 for the metal vessel or steel mold 72 fits into the opening 61. The slide assembly 54 is provided with insulation 74 at the side thereof facing towards the suction port 44 so that it can withstand the strong thermal action of the glass melt. The slide assembly 54 is displaced by means of a hydraulic actuator including a cylinder 76 fixedly mounted to the slide housing 52. The piston rod 80 of the cylinder 76 is connected to the slide assembly 52 by a transverse rod 84 and a thrust rod 86. The slide assembly 52 includes a carrying trough 90 wherein a pan-shaped support 92 for a sealing cover 94 for the steel mold 72 is arranged.

Figure 5:
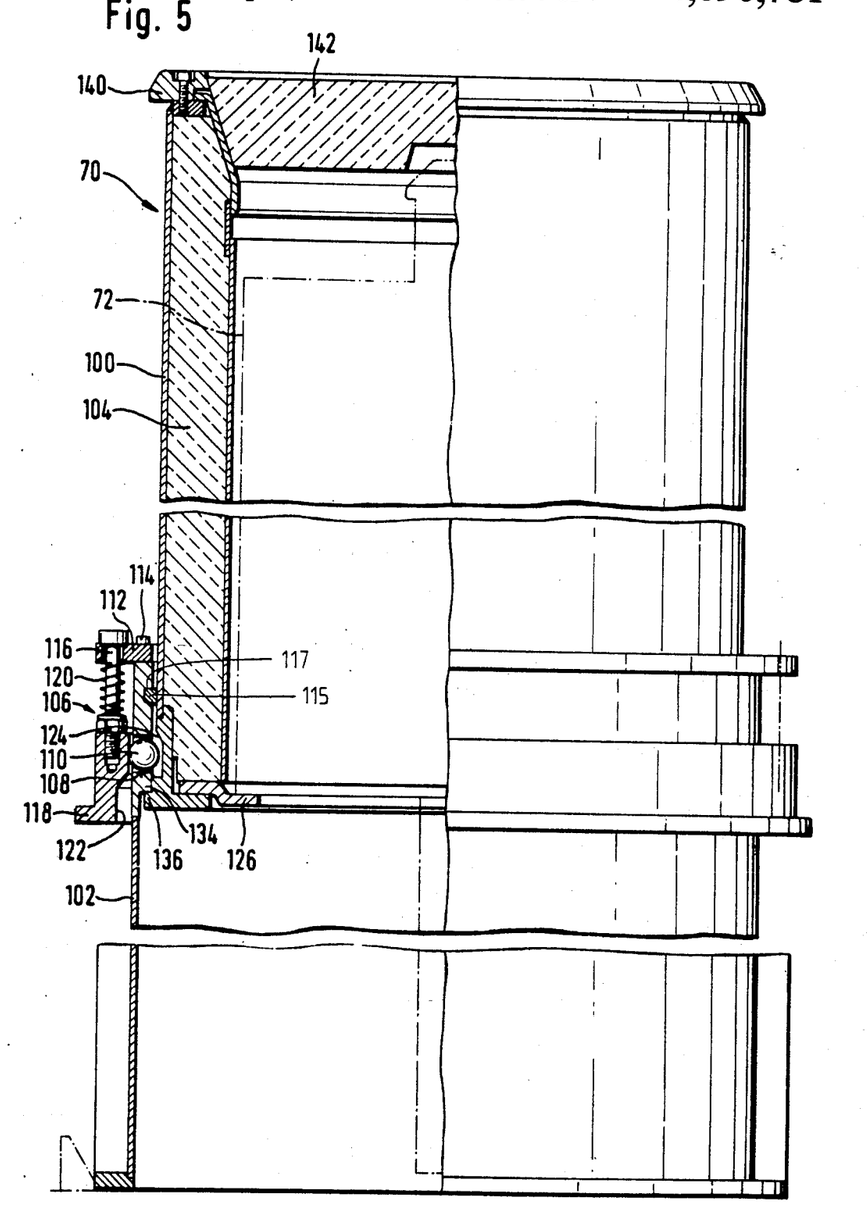
FIG. 5 is a side elevation view, partially broken out, of the holding device with the metal vessel shown in phantom outline.

Referring to FIG. 5, the holding device 70 for the steel mold 72 includes two telescoping hollow cylinders displaceable one with respect to the other in the form of a tubular casing 100 and a protective sleeve 102. The steel mold 72 is arranged in the tubular casing 100 provided with insulation 104. The tubular casing 100 is displaced in the protective sleeve 102. For the purpose of conveying the entire holding device 70 with the empty steel mold 72, the tubular casing 100 and protective sleeve 102 can be latched together by a ball-type latching mechanism 106.

The latching mechanism 106 includes radial bores 108 formed in the top end portion of the protective sleeve 102. The radial bores 108 are adapted to accommodate latching balls 110 therein. A flange 112 projects beyond the outer diameter of the sleeve 102 and is fixedly mounted on the end face of the sleeve 102 by means of threaded bolts 114. Shoulder screws 116 are guidingly held in the flange 112 and threadably engage a latching ring 118. The shoulder screws 116 are each surrounded by a compression spring 120 having ends bearing against the flange 112 and the latching ring 118, respectively. The latching ring 118 has a receiving recess 122 ground into its inner surface and the balls 110 can be displaced to project into recess 122 in the unlatched position. The tubular casing 100 has a similar recess 124 on the outer surface of its lower end portion for receiving the latching balls 110 when the latching mechanism is in the latched condition as shown in FIG. 5.

The tubular casing 100 has an inwardly projecting flange 126 at the lower end thereof which defines an annular surface for the edge of the steel mold 72.

The protective sleeve 102 has an inner abutment 134 at its end portion for coacting with an outer shoulder 136 at the lower end of the tubular casing 100. During the time that the holding device 70 in transported in the latched condition, the inner shoulder 134 of the protective sleeve 102 lies on the projection 136 extending from the tubular casing 100.

Referring to FIG. 2, two unlatching brackets 138 and 139 are mounted on the furnace 20 with threaded fasteners. As the holding device 70 is set down, the unlatching brackets 138 and 139 engage under the latching ring 118 and cause it to be displaced upwardly relative to the protective sleeve 102 thereby opening the latching mechanism 106.

Referring again to FIG. 5, tubular casing 100 has an outer holding ring 140 at its upper edge for accommodating a grab device. The top of the tubular casing 100 is closed by a heat insulated sealing cover 142. A guide ring 115 is seated in an annular groove 117 formed in the inner wall surface of the upper end portion of protective sleeve 102 for guiding the movement of the tubular casing relative to the latter.

Figure 6:
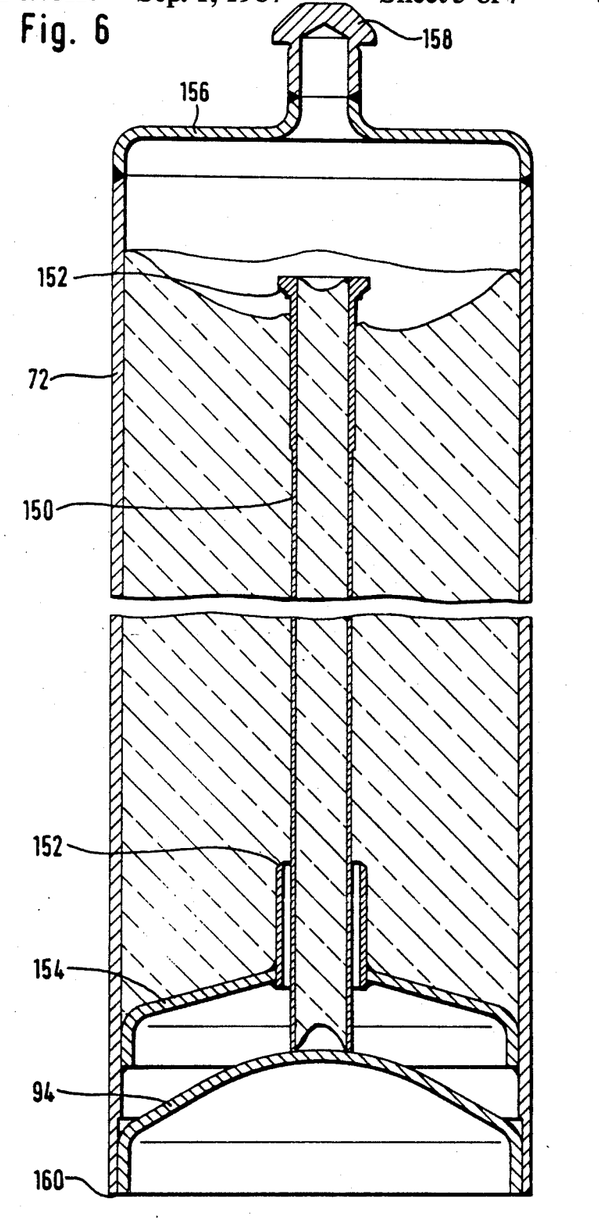
FIG. 6 is a metal vessel which has been filled with glass melt and closed with a sealing cover; and, FIGS. 7 to 19 are schematic representations of the steps of the method of the invention.

A filled steel mold 72 is shown in FIG. 6 after it has been closed by a sealing cover 94. With this action, the suction tube 150 is pushed into the interior of the vessel after being broken away from a predetermined breaking location 152 at the opening in the bottom of the vessel 154. The steel mold 72 has a mushroom-like knob 158 at its upper surface 156 whereat appropriate lifting means can grasp and lift the mold.

The operation of the above-described embodiment will now be described in detail with reference to FIGS. 7 to 19 which show the various working positions of the apparatus of the invention during a filling and closure process.

Figure 7:
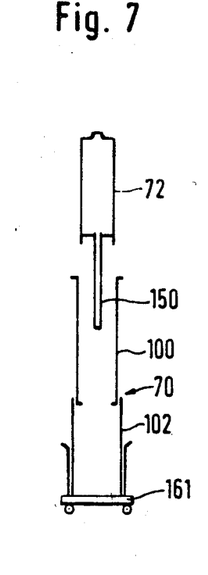
Figure 8:
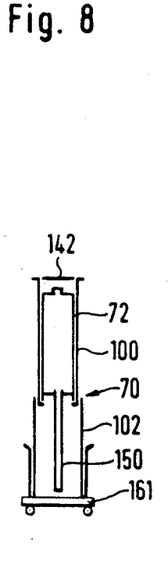
Figure 9:
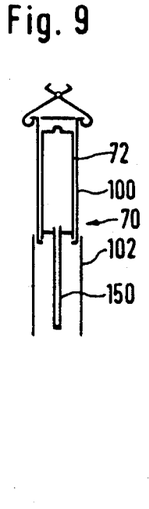
Figure 10:
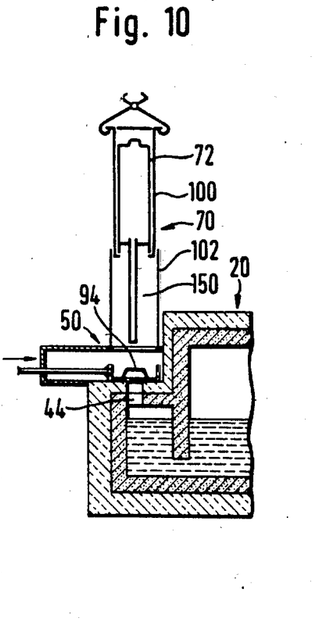

The prepared and evacuated steel mold 72 is loaded into the holding device 70 from above with the holding device in the extended position and arranged vertically in an appropriate carriage 160 having a supporting frame as shown in FIGS. 7 and 8. With the steel mold 72 in the position shown, the bottom external annular edge surface 160 thereof rests on the inner annular shoulder 126 of the tubular casing 100 of the holding device 70. The tubular casing 100 and protective sleeve 102 of the holding device 70 are latched firmly together in the extended condition. This protects the suction tube 150 mounted at the bottom wall 154 of the mold 72 from damage during transport. The holding device 70 with the mold 72 placed therein is lifted with the aid of a crane or power manipulator (FIG. 9) and positioned over the ceramic melting furnace 20 so as to cause the end of the suction tube 150 to be above the suction port 44 (FIG. 10).

Before the holding device 70 is lowered, a container sealing cover 94 is placed on the slide assembly 54, the latter closing the suction port 44.

Just before the holding device 70 is set down on the housing 54 of the closure device 50, the latching ring 118 engages the unlatching brackets 138 and 139 thereby unlatching the holding device 70. The tubular casing 100 continues to hang from the crane and is now displaceable within the protective sleeve 102.

Figure 11:
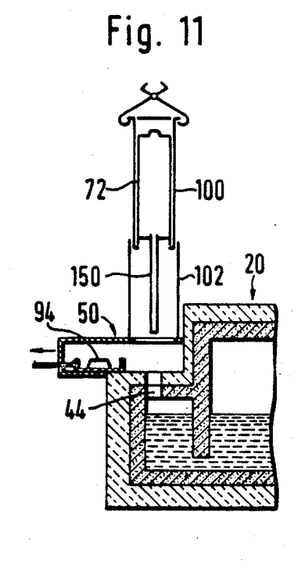
Figure 12:
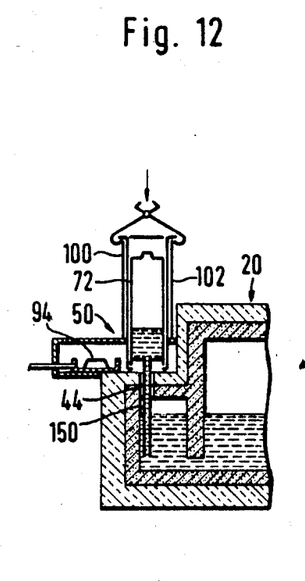
Figure 13:
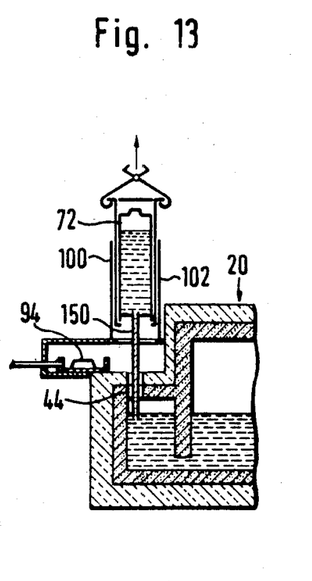

By charging the hydraulic actuator 76, the slide assembly 54 is moved into the rearward or withdrawn position so that the suction port 44 is opened (FIG. 11). Air is excluded from the suction port 44 by the sleeve 102 of the holding device 70. The mold 72 now is lowered with the tubular casing 100 until the lower edge of the casing of the mold stands on the furnace portion 42. At the same time, the suction tube 150 passes through the suction port 44 and enters the adjacent chamber 28 where it dips deeply into the glass melt (FIG. 12).

The hot glass melt causes the closure of the suction tube 150 to fuse open so that the steel mold 72 fills with glass melt by suction because of the partial vacuum present in the evacuated mold 72. Since the tubular casing 100 is hanging from the crane, the increase in weight and therefore the filling level of glass melt in the mold 72 can be ascertained by suitable weighing means (not shown).

When the filling operation is complete, the tubular casing 100 is raised a predetermined distance (FIG. 13) and cooling gas is blown at the top portion of the suction tube 150 until that portion has cooled slightly. This leads to the formation of a glass plug in that part of the suction tube 150. The steel mold 72 is then raised further until the tube 150 no longer dips into the melt. Some of the glass melt located in and on the suction tube then flows back into ancillary chamber 28.

Figure 14:
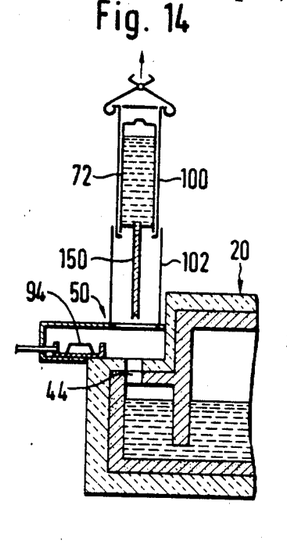
Figure 15:
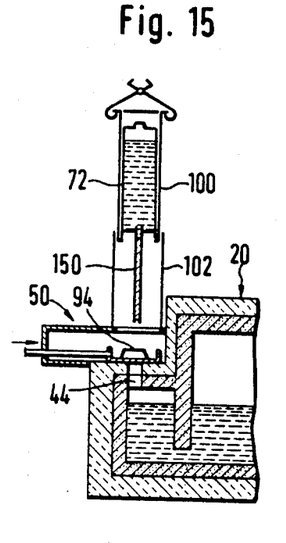

The tubular casing and mold are then raised still further until the suction tube 150 is over the step 42 of the furnace (FIG. 14). The suction port 44 is closed by the slide assembly 54. The sealing cover 94 for the steel mold 72 lies on the pan-shaped support 92 of the slide assembly 54 (FIG. 15).

Figure 16:
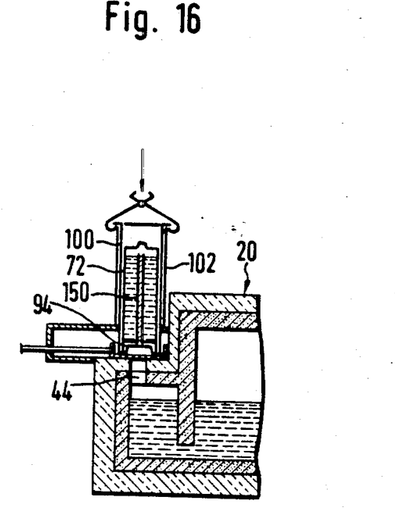

By thereafter lowering the mold 72, the suction tube 150 strikes the inside surface of the sealing cover 94 positioned in the pan-shaped support 92. The weight bearing axially on the suction tube 150 causes the tube to break off at a predetermined break location 152 inside the mold 72. The metal mold 72 is lowered further thereby causing the suction tube 150 to be pushed into the mold. Finally, as the mold 72 is lowered, the lower edge thereof slides over the pre-positioned sealing cover 94 (FIG. 16). Since the sealing cover 94 is at a substantially lower temperature than the edge of the mold, the cover 94 is fixed to the mold by shrinkage of the wall of the mold as the temperature between the two parts equalizes. Appropriate dimensions have previously been chosen for the cover 94.

Figure 17:
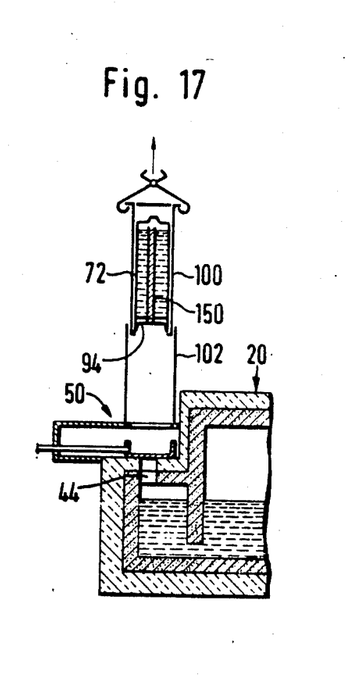
Figures 18, 19:
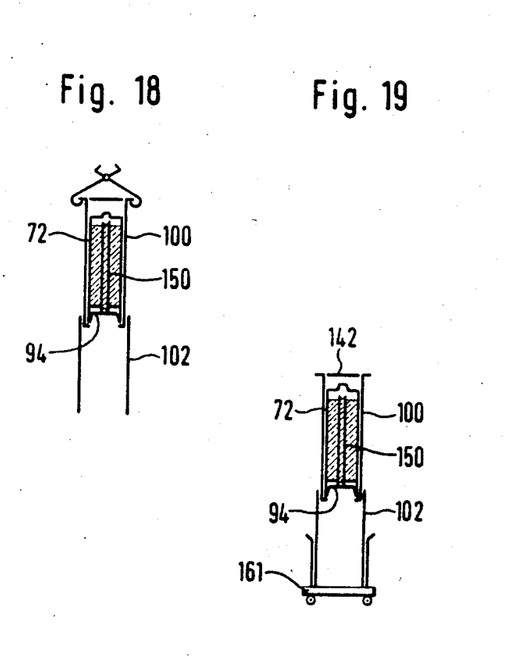

The hoist again lifts the insulated tubular casing 100 with the filled and now capped metal mold 72 until the inner and outer sleeves 100, 102 of the holding device 70 are latched together again in the extended condition (FIG. 17). Further raising of the holding device 70 takes it away from the furnace 20 and the closing device 50 (FIG. 18). It is then placed in the framework carriage 160 (FIG. 19) and transported to a location where the mold is treated.

The filled metal vessel 72 is preferably left in the holding device 70 for several days. Since the tubular casing 100 is heat insulated, the process of cooling the glass melt may be delayed thereby preventing any buildup of thermal-mechanical stresses.

It is understood that the foregoing description is that of the preferred embodiments of the invention and that various changes and modifications may be made thereto without departing from the spirit and scope of the invention as defined in the appended claims.

What is claimed is:

1. Method of filling a metal vessel with a radioactive glass melt from a glass-melt furnace disposed in a cell of a nuclear facility and having a closable suction port that communicates with a chamber of the furnace containing the radioactive glass melt, the vessel being provided with a suction tube mounted on the base wall thereof so as to communicate with the interior of the vessel and being sealed with a solid fused mass, the method comprising the steps of:

placing the metal vessel with the sealed suction tube extending therefrom into a holding device surrounding the vessel, the metal vessel being evacuated so that a partial vacuum is present therein;

positioning the holding device over the closable suction port of the glass-melt furnace so as to align the suction tube with respect thereto and so as to cause the holding device to hermetically seal off the suction port with respect to the atmosphere in the cell;

opening the suction port thereby causing said chamber to communicate with the interior of said holding device;

lowering the metal vessel until the suction tube dips into the glass melt in said chamber thereby causing said solid fused mass to melt whereby the glass melt flows upwardly into the metal vessel;

freezing the glass melt in the suction tube thereby again sealing the same with a solid fused mass;

moving the metal vessel upwardly until the suction tube is withdrawn from said furnace;

closing the suction port and positioning a sealing cover for the vessel directly beneath the metal vessel so that the inner surface of said cover faces upwardly; and, again lowering the metal vessel to cause the suction tube to come into contact engagement with said inner surface thereby pushing the suction tube into the vessel as the same is lowered further and finally seating said cover in said vessel.

2. The method of claim 1, comprising the further step of determining the level to which the metal vessel has been filled by measuring the net weight of the glass melt flowing into the vessel.

3. The method of claim 1, after the metal vessel has been filled with the radioactive glass melt, the method comprising the further steps of lifting the metal vessel somewhat so that the end of the suction tube still remains immersed in the glass melt in the chamber; and, thereafter spraying a refrigerant on the suction tube at the upper portion thereof to thereby again seal the same with a solid fused mass.

* * * * *

UNITED STATES PATENT AND TRADEMARK OFFICE
CERTIFICATE OF CORRECTION

PATENT NO. : 4,690,781

DATED : September 1, 1987

INVENTOR(S) : Wilfried Heimerl and Eckhart Ewest

It is certified that error appears in the above-identified patent and that said Letters Patent is hereby corrected as shown below:

On the title page, next to the heading "Assignee": delete "Wideraufarbeitung" and substitute -- Wiederaufarbeitung -- therefor.

Signed and Sealed this

Twelfth Day of January, 1988

Attest:

DONALD J. QUIGG

Attesting Officer

Commissioner of Patents and Trademarks